Dec. 1, 1964 H. J. HOFMEISTER, JR., ETAL 3,159,468
OVERHEAD PLENUM CHAMBER FOR DRYING CROPS IN VEHICLES
Filed April 4, 1961 3 Sheets-Sheet 1

INVENTORS
HARRY J. HOFMEISTER, JR.
WILLIAM T. YOUNG
WILLIAM HOBBS, JR.

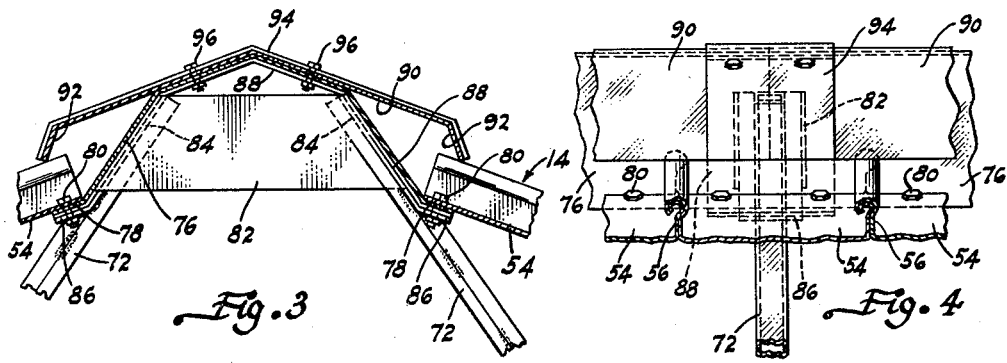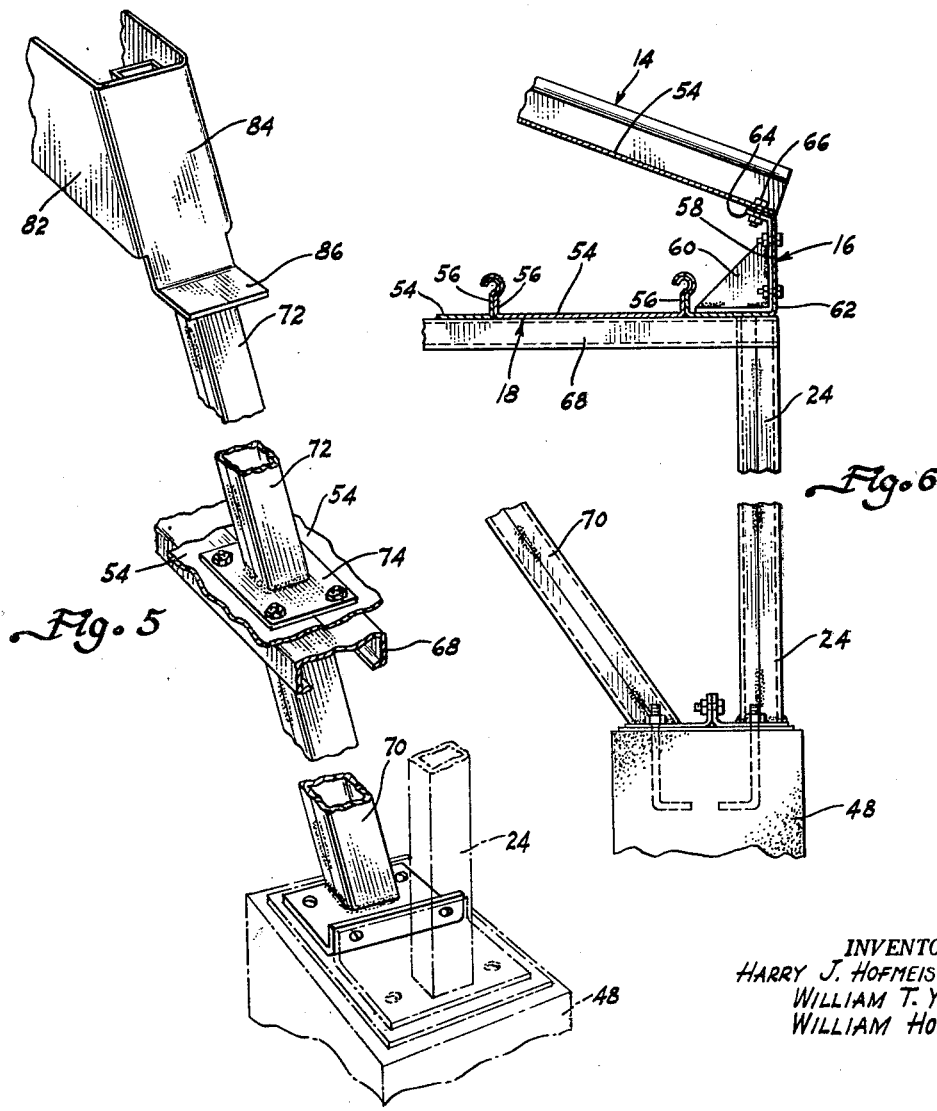

Dec. 1, 1964   H. J. HOFMEISTER, JR., ETAL   3,159,468
OVERHEAD PLENUM CHAMBER FOR DRYING CROPS IN VEHICLES
Filed April 4, 1961   3 Sheets-Sheet 3

INVENTORS
HARRY J. HOFMEISTER, JR.
WILLIAM T. YOUNG
WILLIAM HOBBS, JR.

United States Patent Office 3,159,468
Patented Dec. 1, 1964

3,159,468
OVERHEAD PLENUM CHAMBER FOR DRYING
CROPS IN VEHICLES
Harry J. Hofmeister, Jr., New Holland, William T. Young,
Fleetwood, and William Hobbs, Jr., Lancaster, Pa.,
assignors to Sperry Rand Corporation, New Holland,
Pa., a corporation of Delaware
Filed Apr. 4, 1961, Ser. No. 100,566
10 Claims. (Cl. 34—233)

This invention relates to improvements in a drying structure, and, more, particularly, to a drying structure preferably adapted for use with the drying of various kinds of agricultural crops and products, especially forage crops, but without restriction thereto, inasmuch as the structure also is readily capable of drying other types of material, such as grain, and the like.

Various types of both portable and stationary drying arrangements have been devised and used heretofore for the drying of agricultural products and crops. Some of these arrangements have comprised large, flexible bag-like members which extended between a heating unit which produced a substantially constant stream of hot air, the flexible bag-like member also extending over the top of a wagon, for example, in which either loose or bailed products or material were contained and through which the heated air was passed under pressure, the same discharging through suitable openings in the sides and/or bottom of the wagons. The handling of such flexible bag-like members is cumbersome and awkward, especially since the same are large and considerable care, also, must be exercised, so as to prevent tearing, or otherwise puncturing, the material from which the bag-like members are formed. Under the conditions described, the heater unit may be mounted either portably or stationarily, depending upon the particular drying arrangement employed.

Other attempts to provide a suitable drying unit or mechanism for agricultural products has comprised a stationary structure somewhat resembling a shed, and comprising a frame supporting a roof. Beneath the roof, and within what might be termed the attic of the shed, a large canvas duct was suspended so as to extend along the upper portion of the shed beneath the roof from one end of the shed at which one end of the canvas duct was connected to a heater unit to receive hot air therefrom. The canvas duct also was provided with a plurality of outlet openings arranged to discharge hot air therethrough into the upper portions of loads of agricultural products upon wagons of the type described above, for example, and over which shrouds or covers extended, the upper ends of these being connected to the outlet openings in the canvas conduit.

Handling and arranging, as well as connecting the upper ends of the shrouds and covers to the outlet openings of the canvas conduits, was extremely awkward and cumbersome, to say the least. Draping the covers and shrouds over the upper ends of the wagons, or other types of vehicles, took place at substantial heights frequently higher than an average man conveniently can reach, thereby necessitating climbing and manipulating the shrouds and covers from awkward positions, the same frequently resulting in damage to said covers. Suspending the canvas conduits in the upper portion of the shed presented certain supporting problems not capable of easy solution and, even at best, there were no very satisfactory means to brace the canvas conduits, whereby the principal means for maintaining its shape comprised the hot air passing therethrough under pressure.

It is the principal object of the present invention to provide a drying structure principally comprising an elevated plenum chamber which is stationary and rigid, said chamber principally being defined by sheet-like panels connected to serve the additional function of both roof and ceiling means and functioning somewhat in a skin-stressed manner, column-like supporting means depending from said chamber to a supporting surface, such as either a paved surface or a preferably smooth area of ground, the supporting means also being spaced in transverse directions to define passageways or bays into which wagons loaded with material to be dried readily may be moved for connection with outlet means from the plenum chamber, so as to receive drying gases therefrom.

Another object of the invention is to provide a minimum type of structural frame which not only supports the sheet-like panels comprising a skin-like covering defining the plenum chamber, but also bracing the elevated plenum chamber against movement, said bracing means also aiding in defining the bays within which the loads of material are to be moved.

A further object of the invention is to provide a drying structure comprising an elevated plenum chamber of the type referred to in the preceding objects, which chamber and the supporting frame structure therefor may be extended, within reasonable limits, to provide either a few or a substantial number of bays, the plenum chamber preferably having at least one outlet means for each bay, and said outlet means being provided in the ceiling portion of the plenum chamber, said plenum chamber having adjustable covers movable to various extents across the outlet openings between fully opened and fully closed positions, whereby discharge of drying gases from the plenum chamber through said outlet openings may be regulated so as to insure adequate delivery of drying gases through all of said openings, as desired, from one end of the plenum chamber to the other, notwithstanding the fact that the inlet opening for the plenum chamber preferably is arranged at one end thereof for connection to a heating unit.

Still another object of the invention is to utilize lightweight, elongated and thin sheet-like panels which are connectable at opposite edges thereof quickly and tightly to each other, said connecting means also providing bracing of the sheet-like panels against transverse flexing, whereby simplified frame structure may be used to support said sheet-like panels only at the ends thereof, thus requiring a minimum of connecting means between the covering panels defining the plenum chamber and the supporting frame therefor.

Still further improvements comprise simplified frame structure utilizing a minimum of structural forms, but affording adequate bracing for the elevated plenum chamber, the structural members having means for receiving the opposite ends of the sheet-like panel members for connection thereto.

Details of the foregoing objects and of the invention, as well as other objects thereof, are set forth in the following specification and illustrated in the accompanying drawings comprising a part thereof.

In the drawings:

FIG. 3 is a fragmentary, vertical, sectional view, on a larger scale than used in the preceding figures, and taken on the line 3—3 of FIG. 2.

FIG. 4 is a fragmentary, side elevation of the structure shown in FIG. 3.

FIG. 5 is a perspective, fragmentary, foreshortened view showing portions of the angular bracing means utilized in the drying structure, in accordance with the principles of the invention.

FIG. 6 is a fragmentary, foreshortened view, partly in vertical section, showing details of the eave construction, the column-like supporting members, and the angular bracing members on substantially the same scale as employed in FIGS. 3 and 4.

Figure 1:
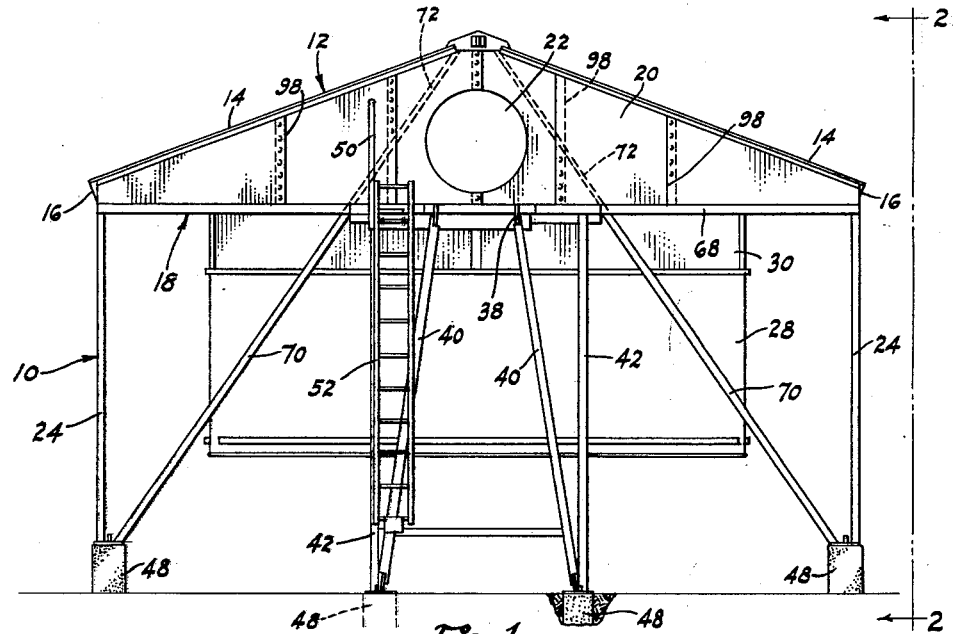
FIG. 1 is an exemplary, end elevation of a drying structure embodying the principles of the present invention.
Figure 2:
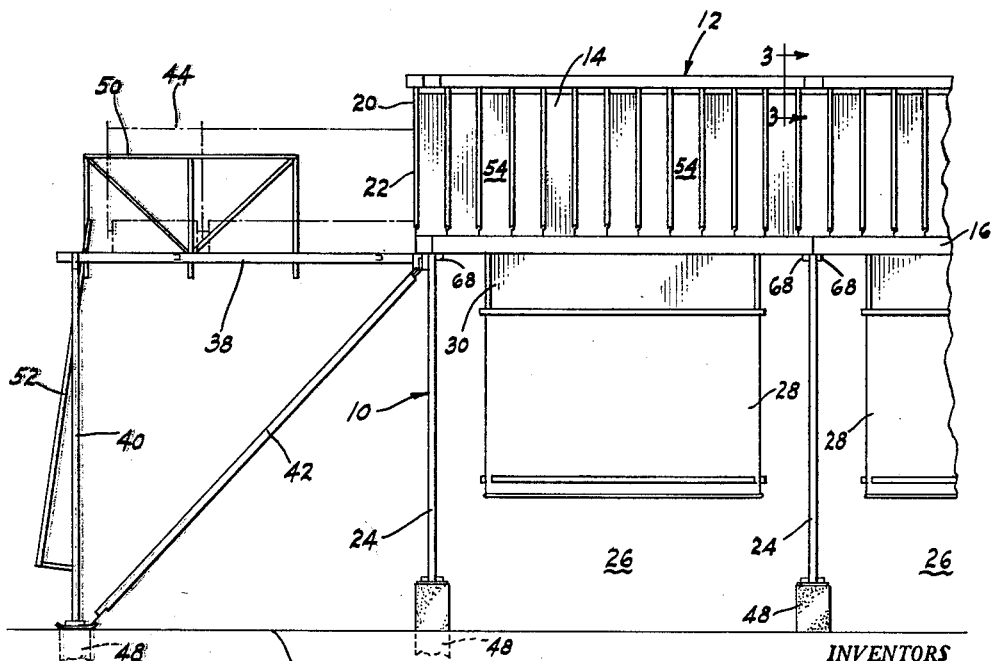
FIG. 2 is a fragmentary, side elevation of the inlet end portion of a drying structure, the same showing, in phantom, an exemplary dryer unit operatively positioned adjacent the inlet of the plenum chamber of the drying structure comprising the invention, as seen from the line 2—2 of FIG. 1.

By referring to FIGS. 1 and 2, it will be seen that the stationary drying structure 10 comprises an elevated plenum chamber 12, which not only is in the upper portion of the structure 10, but serves the additional function of the upper sloping surfaces 14 thereof comprising a gabled roof and, extending horizontally between the eaves 16, is a ceiling 18. Covering the opposite ends of the space between the sloping roof surfaces 14 in the ceiling 18 are vertical ends 20, one of said ends having an opening 22 comprising an inlet for the plenum chamber 12.

The plenum chamber 12 is supported in elevated position by means of a plurality of spaced, structural columns 24, which are spaced apart, both transversely and longitudinally of the plenum chamber 12, so as to provide a plurality of bays 26 within which loads of agricultural, or other forms of products or material to be dried, are moved. Said bays 26 are best shown in FIG. 2, and the same are sufficiently wide to readily accommodate loads of substantial size upon suitable portable means, such as wagons, shown in FIG. 9, which may be wheeled into position by tractors, or the like, within the bays 26 beneath suitable means, such as canvas hoods 28, which are shown in exemplary manner in both FIGS. 2 and 9. The shroud-like hoods 28 depend, for example, from enclosures or boxes 30, within which the collapsible hoods 28 are confined, so as to provide ample clearance within the bay 26 to receive one of the exemplary wagons 32 shown in FIG. 9.

Figure 9:
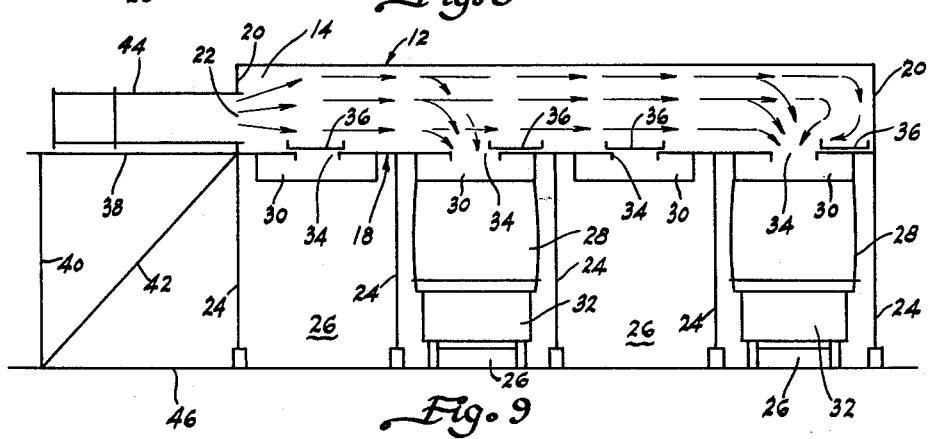
FIG. 9 is a diagrammatic view showing several exemplary loads of material to be dried, positioned beneath certain bays of the plenum chamber and arrows indicating the passage of drying gases from the inlet ends of the plenum chamber to the outlet ends thereof for discharge into the loads of material to be dried.

Ceiling 18, which defines one wall or surface of the plenum chamber 12, is provided with a plurality of outlet openings 34, which are best shown in FIG. 9. The openings 34 are so arranged that they are preferably substantially central of each of the bays 26 and, if desired, more than one of such openings may be provided in each bay. In the exemplary arrangement shown in FIG. 9, however, only one of such openings is shown in each bay. The openings 34 are co-extensive with the boxes 30, and a slidable cover 36 is adjustable, relative to each of the outlet openings 34, between fully opened and fully closed position, or any intermediate position, the positioning of the cover 36, relative to the openings 34, being achieved by control or operating means described hereinafter.

Arranged at one end of the frame structure which supports the plenum chamber 12 is an additional frame 38, which is arranged horizontally and is connected to one end of the frame of the structure which supports the plenum chamber 12, details of which supporting frame are set forth hereinafter. The frame 38 preferably is disposed substantially horizontally and the inner end is connected to the supporting frame for the plenum chamber 12, while the outer end is held in elevated position by additional column-like members 40. Diagonal braces 42 are interconnected at one end to the lower ends of the members 40, while the opposite ends of braces 42 are connected to the frame which supports the plenum chamber 12 and thus braces the plenum chamber against movement longitudinally of the same.

The frame 38 supports an exemplary air heating unit 44, which is shown in phantom in FIG. 2. Said air heating unit has an outlet or exhaust end which communicates and is coaxial with the inlet opening 22 of the plenum chamber 12. The air heating unit 44 may be of any suitable type and consume any convenient type of fuel or energy which provides heat to raise the temperature of air or other gases moving through the air heating unit 44, whereby clean and preferably heated air is discharged from the air heating unit 44 into the plenum chamber 12, without being contaminated by products of combustion, for example. Although only a single air heating unit is illustrated as one end only of the plenum chamber, it is within the purview of the invention to utilize a plurality of air heating units, if desired, respectively at opposite ends of the plenum chamber 12 and both feeding heated air into the chamber, either selectively or simultaneously, as desired or required, especially if the chamber 12 is quite long, as in an installation of very substantial size.

The structural columns 24 and column-like members 40 preferably extend substantially vertically and depend, respectively, from the plenum chamber 12 and frame 38 to a supporting surface 46, which may comprise a paved surface or smooth area of ground. If desired, the various column members may be connected to footers 48 having upper ends either flush with the supporting surface 46 or extending thereabove, these several types of footers being shown in both FIGS. 1 and 2. Also, the frame 38 may be provided with a guard rail 50 and a ladder 52 extends from near the supporting surface 46 to the frame 38 to permit an attendant to readily climb to the frame 38 and service the air heating unit 44.

To describe the principles of operation of the generally basic structure described hereinabove, products, and particularly agricultural products, to be dried, such as wagon loads of grain, baled hay, alfalfa, and the like, are wheeled, while contained in a wagon 32, or other portable means, into one or more of the bays 26 of the stationary drying structure 10. The wagons 32 preferably are substantially centered beneath the boxes 30 and canvas hoods or shrouds 28, whereupon the collapsed hoods 28 are lowered, so as to surround the wagons 32 and, by means of suitable drawstrings, or the like, the lower ends of the hoods 28 are made relatively fast around the sides of the wagons 32. It also will be understood that the sides and bottoms of the wagons 32 are perforated suitably so as to permit the discharge of moisture-laden air therethrough, in accordance with the best principles of operation of the present invention.

Drying air, preferably heated, is generated, under substantial pressure, by the air heating unit 44 and discharged through the inlet opening 22 into the plenum chamber 12. The outlet openings 34 of each bay in which material is contained are opened a suitable amount by slidably moving the covers 36, by means to be described, the amount of opening movement of the covers 36 being regulated so as to insure that there will be substantially even discharge of drying gases through each of the outlet openings 34 in suitable proportion to the amounts and conditions of the material to be dried within the wagons 32, for example, whereby maximum achievement of the drying results. Obviously, relative to the bays 26, which do not contain material to be dried, the covers 36 will remain closed, as shown in exemplary manner in FIG. 9.

The passage of drying gases through the material to be dried is continued until the desired amount of drying has been achieved, relative to each load of material, for example, whereupon the cover 36 for the outlet opening 34 which has been discharging drying gases into said material then is closed, following which the canvas hood 28 is elevated, so as to permit removal of the wagon 32 containing the dried material. At the completion of the entire drying operation in all bays, the air heating unit 44 then is shut off.

The basic principles of operation of the present invention having been described, preferred structural details of the plenum chamber, supporting means therefor, and the control of the discharge of drying gases therefrom now will be described, the same comprising part of the present invention, as follows.

Figure 7:
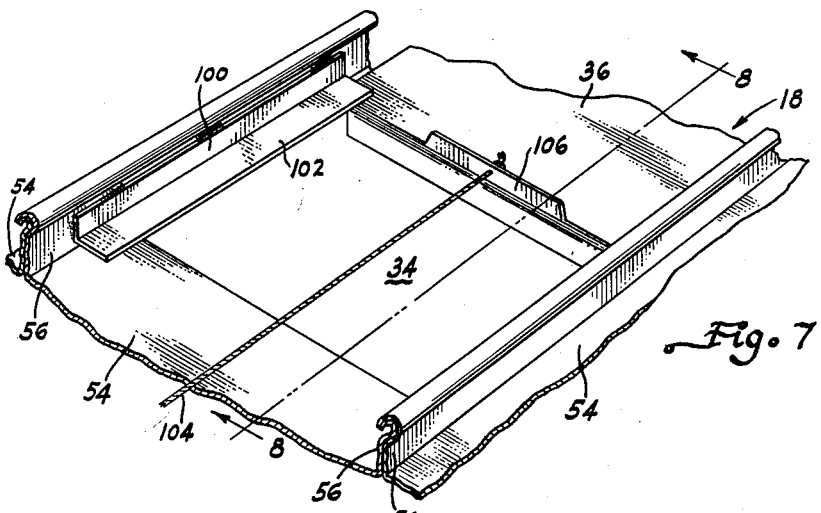
FIG. 7 is a fragmentary, perspective view of a portion of the ceiling structure which partially defines the plenum chamber and showing, in fragmentary manner, a slidable cover adjustably positionable relative to one of the outlet openings in the ceiling portion of the plenum chamber.
Figure 8:
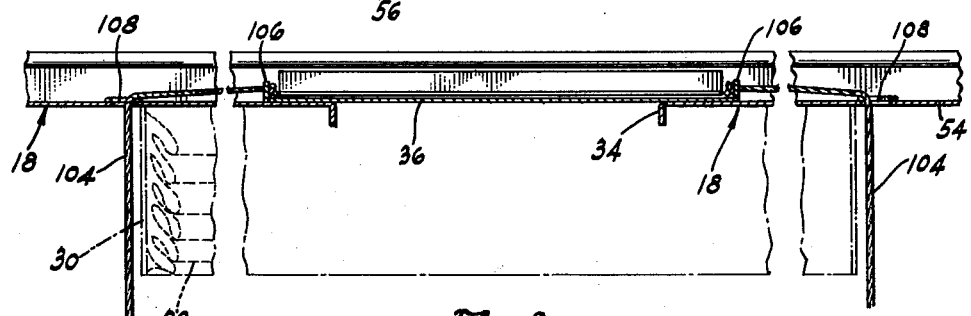
FIG. 8 is a fragmentary, vertical, sectional elevation taken on the line 8—8 of FIG. 7 and showing a slidable cover in closed position over one of the outlet openings from the plenum chamber.

In accordance with the principles of the present invention, it is preferred that the plenum chamber be defined by sheet-like, preferably lightweight panels 54, which preferably are of a predetermined, uniform length, such as of the order of 10 or 12 feet, and uniform width of the order of at least 12 inches, for example, suitable examples of such panels comprising the subject matter of co-pending application Serial No. 77,408, filed December 21, 1960, and assigned to the assignee of the instant invention. These panels 54 are provided at the opposite edges thereof with vertically extending side flanges 56, best shown in FIG. 7, the outer edges thereof being rolled so as to assume somewhat cylindrical configurations which inter-nest with each other to facilitate quick connection of the panels to each other, simultaneously, also providing a substantially airtight connection. When a plurality of such panels are connected together, they have sufficient strength to function similarly to so-called skin-stressed sheets or panels so as to afford a substantial amount of inherent bracing of the structure to which they are connected.

While the principles and functions of said panels are described in greater detail in said co-pending patent application, for purposes of explaining the present invention, it is considered sufficient to state that the side or edge flanges 56, being coextensive in length with the panels 54, support the same very satisfactorily against appreciable flexure without additional bracing intermediately of the ends thereof, especially when the panels 54 are formed of sufficient thickness from some suitable lightweight material as aluminum, sheet steel, or the like, and are not in excess of a predetermined length computed relative to the thickness of the panels and height of the edge flanges.

Extending along the eaves 16 are special structural eave members 58, the cross-sectional shape of which is best shown in FIG. 6. These members may be formed from any appropriate material, such as sheet aluminum, steel, or the like, and at periodic intervals, the members 58 are provided with transverse, bracing plates 60, which are welded to the inner surfaces of the panel-like eave members 58. Also, at each of the eaves of the sloping roof surfaces 14 are special eave panels 62, one edge of each of these special eave panels 62 having a flange 64, which is complementary and interfitting with the edge flanges 56 of the substantially flat panels 54.

The uppermost edges of the eave members 58 and eave panels 62 are co-extensive in length with the plenum chamber 12. Referring to the upper edge 64 of eave member 58, as shown in FIG. 6, it will be seen that the same extends at a dihedral angle to the vertical side wall thereof, for purposes of having the lower ends of roof-forming panels 54 connected thereto by bolts 66, or the like. As is best shown in FIG. 2, the sloping roof surfaces 14 are formed from a plurality of interconnected panels 54, which are the same as the panels 54 which form the ceiling 18, except that the ceiling panels 54 are arranged differently in that they extend transversely to the roof panels 54.

Extending transversely beneath the plenum chamber 12 and aiding in the support thereof are a plurality of transverse structural members 68, which, in accordance with the preferred principles of the invention, comprise channels, the details of which are best shown in FIG. 5. The channels 68 extend transversely of the plenum chamber between opposite structural columns 24, and the ends of the transverse members 68 may be secured to the upper ends of the columns 24 by any suitable means, such as welding, bolts, or the like. Further, the structural columns 24 may be formed so as to have appreciable strength, and yet be lightweight, such as by welding the abutting edges of the side flanges of channel members, whereby a hollow column is formed, as best shown in detail in FIG. 5.

The transverse members 68, being connected to the upper ends of the columns 24, cooperate with said columns to define the bays 26 and the panels 54 are arranged to extend transversely across said bays, whereby said panels are supported by the transverse members 68. Said panels preferably are the same length as the width of the bays. Under the circumstances, as seen from FIG. 5, the ends of the panels 54 not only are supported by resting directly upon the transverse members 68, but said ends of the panels 54 preferably abut each other closely, as is clear from FIG. 5, to aid in providing an air-tight structure.

Particularly for purposes of supporting the apex of the gable-type roof, the structure 10 is provided with a plurality of diagonal bracing members 70, which, in their overall concept, extend inwardly from said footers and upwardly to said apex. Like the columns 24, members 70 may be formed from abutting pairs of channels, the flange edges of which are welded together to form tubular, structural members. These diagonal members preferably are interrupted intermediately of their ends, the lower sections thereof extending from the footers 48, for example, to the transverse structural members 68, as is best shown in FIG. 5. Suitable arrangements, not shown, may be used, either to bolt the upper ends of these lower sections of the diagonal bracing members 70 to the members 68, or said upper ends of members 70 may be welded to the members 68. Co-axial extensions 72, which comprise extensions of members 70, are provided with flanges 74, for example, at the lower ends thereof, so that the same may be bolted against the upper surfaces of the panels 54 and, thereby, be fixed, relative to the transverse members 68, as shown in FIG. 5. If desired, the extension 72 may be of a slightly smaller cross-sectional size than the lower bracing members 70.

The apex of the upper surfaces or roof of the plenum chamber 12 is formed in a unique manner, as a result of utilizing the relatively simple frame structure described hereinabove. Extending longitudinally along the adjacent upper edges of the sloping surfaces 14 which define the roof composed of a plurality of connected panels 54, is a generally A-shaped apex member 76, the cross-sectional shape of which is best shown in FIG. 3. It will be seen that the member 76, which may be composed of a series of longitudinally abutting sections connected together, is composed of six integral panels or flanges, readily seen in FIG. 3, the outermost flanges 78 of which are parallel to and co-planar with the upper edges 64 of eave members 58. The flanges 78 receive the upper ends of the roof-forming panels 54 in tight, abutting relationship for connection to the flanges 78 by any suitable means, such as bolts 80.

The apex member 76 rests upon and is supported by a plurality of terminal bracing members 82. As best shown in FIG. 5, the members 82 are somewhat box-shaped, but the opposite sides thereof slope inwardly toward each other, as clearly seen in FIG. 3. To accommodate the members 82, the outer longitudinal half of the upper end portions of the extension members 72 are cut away, as is clearly seen from FIG. 3. The sloping side panels 84 of the box-shaped bracing members 82 may be secured to the projecting upper end portions of extension members 72 by any suitable means, such as welding, and the lower edges of the side panels 84 terminate in angularly and outwardly extending tongues 86, best shown in FIGS. 3 and 5. Disposed between the sloping side panels 84 and the A-shaped apex members 76 are intermediate straps 88 formed from sheet metal and complementary in shape to the A-shaped apex member 76. These straps are wider than the side panels 84 of the bracing members 82, as best shown in FIG. 4, and, therefore, are suitable to form supporting means underlying abutting ends of sections of apex members 76, particularly since the intermediate straps 88 are suitably secured to the bracing members 82.

Inasmuch as the apex members 76, whether continuous or connected, abutting sections, are impervious, and the upper ends of the panels 54, which comprise the sloping roof surfaces 14, tightly abut the upper surfaces of the outer flanges 78 of apex members 76, it will be seen that the apex portion of the plenum chamber 12 is airtight. However, to form a suitable finish for the apex, and especially to render the upper ends of the connected panels 54 protected against the ingress of rain, snow, and the like, an apex cover member 90, which is generally A-shaped in cross-section, as best shown in FIG. 3, extends along the outer surface of apex member 76, but is wider than the latter and has down turned terminal flanges 92, which abut the curved outer ends of the side flanges 56 of the roof-forming panels 54, it being understood that the side flanges 56 will brace the roof-forming panels 54 against any appreciable flexing. To brace the apex cover member sections 90, and also to cover any abutting joint between sections thereof, a cover strap 94, which is complementary in shape to the apex cover member 90 in cross-section, extends over the outer surface of said cover member 90, and particularly covers abutting sections thereof. Any suitable means, such as bolts 96, may be employed to secure the cover straps 94 and apex cover members 90 commonly to the intermediate straps 88 and apex members 76, as clearly shown in FIG. 3.

As best seen in FIG. 1, the opposite ends of the plenum chamber are defined by vertical ends 20. These ends may be formed from suitable sheet material, the opposite edges of which overlap, as indicated at 98, and, if desired, suitable vertical frame members, such as angle irons, may be employed on the interior of the plenum chamber to serve as anchoring means for these overlapping edges of the cover sheets comprising the vertical ends 20. It will be understood that appropriate airtight connections are to be made between the other edges of the panel sheets comprising ends 20, and the panels 54 comprising the ceiling 18 and the sloping roof surfaces 14. As a result of such construction, and also the airtight connections of the panels 54 to their various supporting members of the frame structure for the plenum chamber, a substantially airtight chamber is provided which is capable of sustaining relatively high pressures developed by the drying gases generated within the air heating unit 44, for example, and discharge through the inlet 22 into said plenum chamber 12.

As has been described in general above, discharge of the drying gases from the plenum chamber 12 occurs through the outlet openings 34, and these means are arranged to be covered either completely or to various degrees, or rendered fully open, depending upon the degree to which the slidable covers 36 are placed over the outlet openings 34. Relatively simple support and guide means for the covers 36 are provided, the same comprising exemplary angle irons 100, or the like, the horizontal flange 102 of which is spaced above the upper surface of the panel 54 within which the outlet opening 34 is formed to accommodate the thickness of the slidable cover 36. For practical purposes, the outlet opening 34 may be almost as wide as the distance between the side flanges 56 of the panels 54, except for marginal edges which serve as supports for cover 36, and said slidable cover 36 is preferably only slightly narrower than the distance between the side flanges 56, whereby ready slidability of the cover 36, relative to the outlet opening 34, is produced.

Any preferably simple means for controlling the position of the slidable cover 36, relative to its outlet opening 34, may be utilized, such as the relatively simple pull cords 104, respectively connected to upstanding flanges 106, respectively provided at opposite ends of the cover 36. The pull cords 104 may extend through suitable openings 108 in the panels 54, these cords extending downward, for example, adjacent opposite sides of the boxes 30 which enclose the collapsible hoods 28. If it is found that any of the material being dried is receiving too much of the drying gases, or too little thereof, from the plenum chamber, the cords 104 may be manipulated readily to either increase or decrease the size of the outlet opening 34 by regulation of the position of the slidable covers 36, especially to equalize the discharge into the various loads of material being dried, commensurate with the sizes and demands of the individual loads. Further, especially in order that the bays farthest removed from the inlet of the plenum chamber might receive their full and required share of drying gases from the chamber, the outlet opening 34 of such bay could, for example, be fully opened, whereas the outlet openings of the bays nearer the inlet end of the plenum chamber progressively will be less fully opened and the outlet opening of the bay nearest the inlet end of the plenum chamber being the least fully opened, whereby a balancing of the drying gases discharged through said outlet openings is achieved.

From the foregoing, it will be seen that the present invention provides an extremely simple type of drying structure comprising an elevated plenum chamber capable of receiving and discharging drying gases into and through masses of material to be dried. The plenum chamber is formed from a plurality of preferably lightweight and connected panels which readily are handled during the construction of the plenum chamber, whereby the chamber is formed somewhat similarly to skin-stress building structures, and only a minimum type of framing is required and utilized to support the opposite ends of the connected panels comprising the enclosing means defining the plenum chamber. Unique bracing means and apex-forming and sealing means, together with airtight eave constructions and end walls, complete the formation of a substantially airtight plenum chamber. The plurality of outlet means from the plenum chamber are regulatable, relative to each other, so as to balance the amount of drying gases exiting through said outlet openings, and the panels utilized in the structure serve the double function of not only defining the plenum chamber, but also constituting roof and ceiling surfaces for the stationary drying structure.

As an added advantage, the drying structure, when not serving in a drying capacity, may be readily used as a storage means to house farm vehicles, and the like, to protect them against weather.

While the invention has been described and illustrated in its several preferred embodiments, and has included certain details, it should be understood that the invention is not to be limited to the precise details herein illustrated and described, since the same may be carried out in other ways falling within the scope of the invention as claimed.

We claim:

1. A stationary drying structure comprising a frame including a pair of parallel and horizontally spaced eave members, an apex member positioned intermediately of said eave members and substantially parallel thereto at a higher elevation, vertical column members spaced transversely from each other and depending from said eave members to hold the same elevated a distance sufficient to permit portable loads of material to be dried to be moved beneath said eave members, the spacing of said vertical column members in one transverse direction defining bays beneath said chamber open at the ends and sides thereof to receive directly through said opening loads of material to be dried, angular braces extending from the lower portions of said column members to said apex member, frame members extending transversely between said eave members at the level of the upper ends of said column members, sheet-like panels connected together and extending between and resting upon said transverse frame members to comprise a ceiling serving to define a lower surface of a planum chamber and additional sheet-like panels connected together and extending respectively upward to said apex member from said eave members and providing roof means defining upper surfaces of said chamber, said angular braces extending through said ceiling end walls extending vertically between outer edges of said roof means and ceiling to define end surfaces to complete said completely enclosed plenum chamber, one of said end walls having an inlet opening therein and said lower surface of said plenum chamber having outlet openings therein, said inlet and outlet openings respectively receiving and discharging drying gases and said outlet openings being arranged to discharge into loads of material to be dried thereby, and flexible shroud-like hoods surrounding said outlet openings and extending downward therefrom for engagement with the sides of portable vehicles loaded with material to be dried and operable to prevent the escape of drying gases while passing between said outlet openings and said loads of material.

2. The drying structure set forth in claim 1 further characterized by said angular braces being interrupted at ceiling level and the ends of the interrupted portions being fixed to said transverse frame members.

3. The drying structure set forth in claim 1 further characterized by said additional sheet-like panel means defining roof means having flanges on opposite edges thereof abutting similar flanges on adjacent panels and said flanges extending vertically upward from said panels in planes substantially parallel to said end walls of said plenum chamber.

4. The drying structure set forth in claim 3 further characterized by said apex member being substantially A-shaped and connected to the upper ends of said angular braces and provided with flanges at opposite edges respectively to receive and support the upper ends of said panel means defining said roof means, and an elongated generally A-shaped cover member at least partially complementary to and overlying said apex member and the upper ends of said panel means.

5. A stationary drying structure comprising an elevated plenum chamber defined by; gable roof means, end walls connected to the opposite ends of said roof means, and a ceiling extending continuously between the eaves of said gable roof means, said roof means and end walls and ceiling all being formed from impervious panels of sheet-like material connected to each other at adjacent edges thereof, said plenum chamber having an inlet to receive drying gases under pressure from a source thereof and outlet means to discharge drying gases into materials to be dried thereby; and supporting column-like members extending downward from said plenum chamber adjacent said eaves to a supporting surface beneath said chamber and spaced longitudinally along the opposite edges of said chamber to define adjacent bays, and elevated brace means extending upwardly from opposite pairs of said column-like members angularly toward each other past said ceiling and engaging said roof means to brace said drying structure, said elongated brace means being between said bays so as not to interfere with access thereto and the spaces between said column-like members being open to provide free access thereto, whereby portable loads of material to be dried may be positioned between said supporting members and beneath said plenum chamber to communicate with the outlet means thereof to receive drying gases therefrom.

6. The drying structure set forth in claim 5 further characterized by said outlet means being openings in said ceiling and having cover members slidably supported by the upper surfaces of said ceiling panels relative to said openings to vary the effective discharge of drying gases therethrough.

7. A stationary drying structure for outdoor use comprising elongated sheet-like panel members having flanged interlocking means along the long sides thereof operable to connect said members together and also brace the connected panel members against sagging intermediately of the ends of said members, a pair of spaced eave means, apex means positioned between said eave means and above the same, a plurality of said connected panel members extending transversely and angularly upward from said eave means to said apex means to form a gable-type roof, structural members extending transversely between said eave means in spaced relationship to define bays therebetween, supporting members depending substantially vertically from said eave means adjacent the ends of said structural members and of a length to dispose said structural members above a supporting surface sufficiently to permit a portable load of material to be disposed therebeneath for drying and the spaces between said supporting members being open to permit receiving such loads therethrough directly from the outside, an additional plurality of said connected panel members extending lengthwise between said structural members and transversely thereto for support at the ends thereof by said structural members to form a ceiling supported solely by said spaced structural members, end wall means extending substantially vertically between the edges of said panel members forming the roof and those forming the ceiling adjacent the ends of said structure to define a substantially air-tight plenum chamber, inlet means in one end of said chamber to receive drying air under pressure, outlet means in said ceiling operable to discharge heated air into loads of material positioned within said bays beneath said plenum chamber, and flexible shroud-like hoods surrounding said outlet means and extending downward therefrom for engagement with the sides of portable vehicles loaded with material to be dried and operable to prevent the escape of drying gases while passing between said outlet means and said loads of material.

8. The stationary drying structure according to claim 7 further characterized by the adjacent contiguous edges of each of said panel members extending transversely in the same direction from the same surface of said panel members to form flanges to brace the panel members and including interconnecting means, the contiguous surfaces of said panel members between said flanges being substantially flat and certain of said panel members in said ceiling having openings comprising said outlet means positioned substantially midway between the ends thereof for said heated air, and said structure also including a cover member larger than each opening slidably positioned upon the upper surface of the ceiling panel members for support thereby adjacent said opening and operable to be moved between fully open and fully covered position relative to said opening.

9. A stationary drying structure comprising an elevated elongated plenum chamber substantially triangular in cross-section, said chamber being formed from a plurality of elongated panels connected at the edges thereof and forming a roof, ceiling and end walls to render said plenum chamber substantially air-tight, substantially vertical column members connected to and extending downward from the opposite edges of said chamber and spaced longitudinally along said edges to define open bays to receive freely from opposite ends of said bays movable loads of material on vehicles to be dried, the spaces between said columns along the sides of said chamber being open to define openings to said bays, elongated brace means extending upwardly and inwardly between said bays from the lower portions of said column members at opposite edges of said structure past said ceiling and to the apex of said roof, thereby further defining said bays and also bracing said column members in vertical position to support said plenum chamber in elevated position, said ceiling comprising the lower portion of said plenum chamber and being provided with outlet openings in vertical alignment with said bays to discharge drying gases from said chamber into loads of material when positioned within said bays, and flexible shroud-like hoods surrounding said outlet openings and extending downward therefrom for engagement with the sides of portable vehicles loaded with material to be dried and operable to prevent the escape of drying gases while passing between said outlet openings and said loads of material.

10. A stationary drying structure comprising a frame including a pair of parallel and horizontally spaced eave members, an apex member positioned intermediately of said eave members and substantially parallel thereto at a higher elevation, vertical column members spaced transversely from each other to provide open spaces therebetween from the exterior of the structure to the interior thereof and extending downward from said eave members to support the same above the ground a distance sufficient to permit portable loads of material to be dried to be moved through said spaces between said column members and beneath said eave members, angular braces extending from the lower portions of said column members to said apex member, sheet-like panel members connected together and extending substantially horizontally between said eave members to comprise the lower surface of a plenum chamber and additional sheet-like panels connected together and extending respectively between said apex member and said eave members to provide upper surfaces of said chamber, and end walls extending vertically between outer edges of the endmost of said panel members and panels to comprise end surfaces and thereby form a completely enclosed plenum chamber, said lower surfaces of said plenum chamber having outlet openings therein and one of said end surfaces having an air inlet opening therein, said inlet and outlet openings respectively receiving and discharging drying gases and said outlet openings being arranged to discharge into said portable loads of material to be dried thereby.

References Cited by the Examiner
UNITED STATES PATENTS

| | | | |
|---|---|---|---|
| 425,696 | 4/90 | Power | 34—233 |
| 528,496 | 10/94 | Williams | 34—233 X |
| 799,437 | 9/05 | Bechtel | 34—233 |
| 817,508 | 4/06 | Niele | 189—1 |
| 1,319,978 | 10/19 | Taylor | 98—54 |
| 1,362,216 | 12/20 | Barnard et al. | 34—233 X |
| 1,813,523 | 7/31 | Zimmerman | 34—233 X |
| 2,062,160 | 11/36 | Calkins et al. | 189—1 |
| 2,353,073 | 7/44 | Pitou | 189—1 |
| 3,115,396 | 12/63 | James | 34—218 |

NORMAN YUDKOFF, *Primary Examiner.*

CHARLES O'CONNELL, *Examiner.*